United States Patent [19]

Itoh et al.

[11] Patent Number: 5,538,347
[45] Date of Patent: Jul. 23, 1996

[54] DYNAMIC PRESSURE BEARING

[75] Inventors: Masao Itoh; Yuko Takahashi; Yoshio Iwamura; Toyotsugu Itoh, all of Hachioji, Japan

[73] Assignee: Konica Corporation, Tokyo, Japan

[21] Appl. No.: 405,976

[22] Filed: Mar. 17, 1995

[30]       Foreign Application Priority Data

Mar. 24, 1994 [JP] Japan ..................... 6-053986

[51] Int. Cl.⁶ ................................. F16C 32/06
[52] U.S. Cl. .................. 384/107; 384/111; 384/123
[58] Field of Search .................... 384/107, 111, 384/112, 121, 123

[56]       References Cited

U.S. PATENT DOCUMENTS 5,114,245  5/1992  Tanaka ................. 384/107 X
5,127,744  7/1992  White ................... 384/107 X
5,142,173  8/1992  Konno et al. ........... 384/107 X
5,357,162  10/1994 Aiyoshizawa et al. .... 384/112 X
5,399,141  3/1995  Takahashi ............. 384/112 X Primary Examiner—Thomas R. Hannon
Attorney, Agent, or Firm—Frishauf, Holtz, Goodman, Langer & Chick

[57]       ABSTRACT

A dynamic pressure generating bearing includes a rotational body, a radial bearing provided adjacent to a center of the rotational body to rotatably support the rotational body around the radial bearing and at least one thrust bearing provided on one end of the radial bearing. When the rotational body is stably rotated, a minimum clearance generated between the rotational body and the thrust bearing is always greater than a minimum clearance generated between the rotational body and the radial bearing.

12 Claims, 6 Drawing Sheets

DYNAMIC PRESSURE BEARING

BACKGROUND OF THE INVENTION

The present invention relates to a dynamic pressure bearing used for a rotational machine by which a rotational body can be rotated at high speed. In the dynamic pressure bearing, a recess for generating dynamic pressure is formed between a rotational body and an irrotational body. When the rotational body is rotated, a clearance is formed between the rotational and irrotational bodies by the pneumatic action of the recess for generating dynamic pressure, so that the rotational body can be rotated at high speed through the thus formed clearance.

In general, a rotational body having a dynamic pressure bearing is installed horizontally. By the action of the dynamic pressure bearing, the rotational body is rotated at high speed in the following manner:

A wind generated by high speed rotation of the rotational body is introduced into the recess for generating dynamic pressure formed on the irrotational body. By the action of the wind, a strong wind pressure is generated from the recess. This wind pressure is impressed upon a surface of the rotational body, so that a clearance of about several μm is formed between the surface of the rotational body and the surface of the irrotational body. Since the rotational body is rotated through the clearance, the rotational resistance is reduced. A dynamic pressure bearing is well known, which is used for a polygonal mirror rotated at a high speed of not less than 3000 rpm, wherein a clearance of several μm is formed in the radial and thrust bearings by the action of the recess for generating dynamic pressure. This technique is disclosed in Japanese Utility Model Publication Nos. 38330/1992 and 16574/1993.

When the above dynamic pressure bearing is horizontally installed, a clearance of several μm can be maintained between the rotational and irrotational bodies by the action of a wind generated from the recess for generating dynamic pressure, and the rotational body is rotated at low resistance. In the case where the above dynamic pressure bearing is used for a rotational polygonal mirror for laser beam exposure in a small printer or an image recording apparatus, in some cases, it is impossible to horizontally install the dynamic pressure bearing because the installation space and the arrangement of parts are limited. When the dynamic pressure bearing is installed being inclined together with the rotational polygonal mirror, the clearance of several μm can not be maintained and a portion of the rotational body accidentally comes into contact with an opponent surface. As described above, the polygonal mirror is rotated at high speed not lower than 3000 rpm, and the circumferential speed at the periphery is higher than that at the center. When the rotational body is diagonally arranged as described above, or when vibration is given to the rotational body from the outside of the apparatus, the rotational body can not be supported through the clearance, and a peripheral portion of the rotational body is contacted with a portion of the thrust bearing. The dynamic pressure bearing of the prior art has the above disadvantages.

SUMMARY OF THE INVENTION

An object of the present invention is described as follows:
A rotational body is supported by radial and thrust bearings of dynamic pressure type. A clearance between the rotational body and the thrust bearing is set to be larger than a clearance between the rotational body and the radial bearing. Even under the condition that the rotational body is arranged being inclined, or under the condition that the rotational body is horizontally arranged, a periphery of the rotational body, the peripheral speed of which is especially high, does not come into contact with the thrust bearing.

In order to accomplish the above object, embodiments of the present invention are composed in the following manner.

The first embodiment is to provide a dynamic pressure bearing comprising: a rotational body; a radial bearing for rotatably supporting the rotational body, the radial bearing located close to a center of the rotational body; and a thrust bearing provided to at least one end of the radial bearing, wherein the smallest clearance between the rotational body and the thrust bearing is larger than the smallest clearance between the rotational body and the radial bearing under the condition that the rotational body is stably rotating.

According to the second embodiment of the present invention, in the dynamic pressure bearing of the first embodiment, a recess for generating a dynamic pressure is provided in at least one of the radial and thrust bearings.

According to the third embodiment of the present invention, in the first embodiment, in the case of contact with the bearings, the rotational body comes into contact with at least the radial bearing, the circumferential speed of which is lower that of the thrust bearing.

According to the fourth embodiment of the present invention, in the first embodiment, the radial bearing is made of ceramics.

According to the fifth embodiment of the present invention, in the first embodiment, recesses for generating a dynamic pressure are provided in both the radial bearing and the rotational body.

According to the sixth embodiment of the present invention, in the first embodiment, thrust bearings are provided at both ends of the radial bearing.

According to the seventh embodiment of the present invention, in the first embodiment, a clearance between the thrust bearing and the rotational body is provided in such a manner that the clearance is gradually extended as it goes outside from the rotational center.

According to the eighth embodiment of the present invention, in the seventh embodiment, the clearance is extended in accordance with an inclination formed on at least one of the thrust bearing and the rotational body.

According to the ninth embodiment of the present invention, in the eighth embodiment, the clearance is extended by 2 to 5 μm in accordance with the inclination.

The tenth embodiment is composed in the following manner. The dynamic pressure bearing of the present invention comprises: a radial bearing; thrust bearings provided on both sides of the radial bearing; a rotational body rotatably supported by the radial and thrust bearings. When the rotational body is rotated being supported by the radial and thrust bearings, the minimum clearance generated between the rotational body and the thrust bearing is larger than the minimum clearance generated between the rotational body and the radial bearing.

The eleventh embodiment of the present invention is composed in the following manner. In the dynamic pressure bearing described above, in both the radial and thrust bearings, or alternatively in one of the radial and thrust bearings, a recess for generating dynamic pressure is formed.

The twelfth embodiment of the present invention is composed in the following manner. In the dynamic pressure bearing described above, when the rotational body comes into contact with the bearing, the rotational body comes into contact with at least the radial bearing, the peripheral speed of which is low.

The thirteenth embodiment of the present invention is composed in the following manner. In the dynamic pressure bearing described above, the radial bearing is made of ceramics.

The fourteenth embodiment of the present invention is composed in the following manner. The dynamic pressure bearing of the present invention comprises: a radial bearing; thrust bearings provided on both sides of the radial bearing; a rotational body rotatably supported by the radial and thrust bearings. When the rotational body is rotated being supported by the radial and thrust bearings, the minimum clearance generated between the rotational body and the thrust bearing is larger than the minimum clearance generated between the rotational body and the radial bearing. In this case, recesses for generating dynamic pressure are provided in both the radial bearing and the rotational body.

The fifteenth embodiment of the present invention is composed in the following manner. When the rotational body comes into contact with the bearing, the rotational body comes into contact with at least the radial bearing, the peripheral speed of which is low.

The sixteenth embodiment of the present invention is composed in the following manner. The radial bearing is made of ceramics.

The seventeenth embodiment of the present invention is composed in the following manner. The dynamic pressure bearing of the present invention comprises: a radial bearing; a thrust bearing provided on one side of the radial bearing; a rotational body rotatably supported by the radial and thrust bearings. When the rotational body is rotated being supported by the radial and thrust bearings, the minimum clearance generated between the rotational body and the thrust bearing is larger than the minimum clearance generated between the rotational body and the radial bearing.

The eighteenth embodiment of the present invention is composed in the following manner. In the dynamic pressure bearing described above, in both the radial and thrust bearings, or alternatively in one of the radial and thrust bearings, a recess for generating dynamic pressure is formed.

The nineteenth embodiment of the present invention is composed in the following manner. When the rotational body comes into contact with the bearing, the rotational body comes into contact with at least the radial bearing, the peripheral speed of which is low.

The twentieth embodiment of the present invention is composed in the following manner. The radial bearing is made of ceramics.

DETAILED DESCRIPTION OF THE PREFERRED EMBODIMENT

Figure 1:
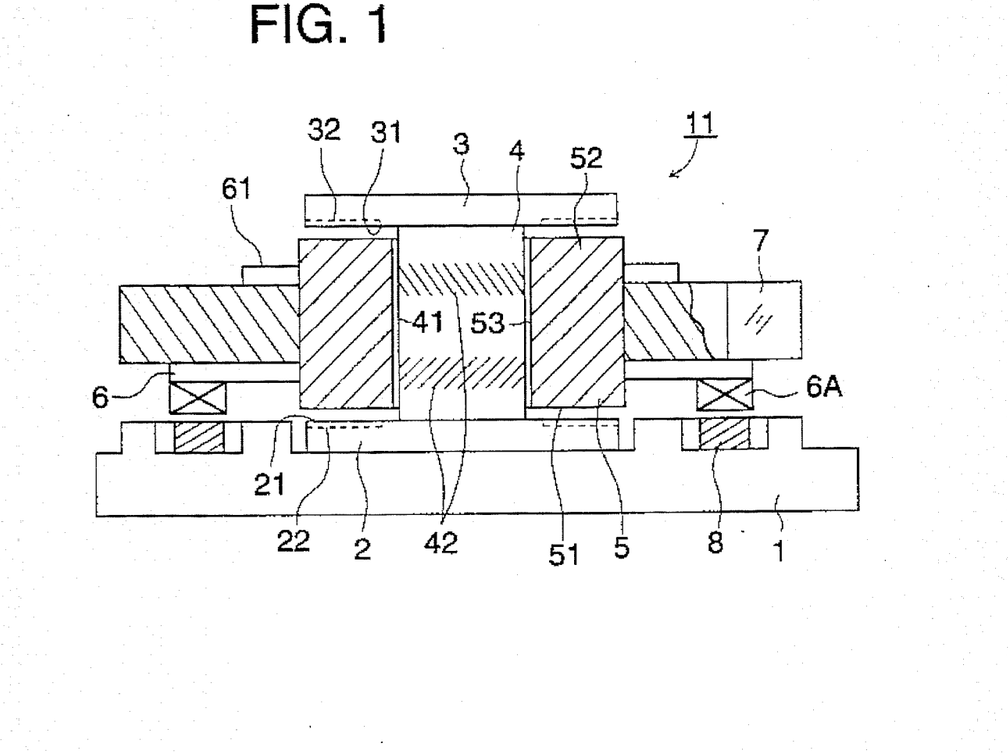
FIG. 1 is a sectional view showing the polygonal mirror for which the dynamic pressure bearing of the present invention is used.

FIG. 1 is a view showing the rotational support device 1 of a polygonal mirror. In the upper and lower positions of the rotational support device 1, there are provided sheet-shaped thrust bearings 2, 3. A radial bearing 4 is interposed between the thrust bearings 2, 3. The dynamic pressure bearing 11 is provided in the above manner. On the guide surfaces 21, 31 of the thrust bearings 2, 3, there are provided dynamic pressure generation recesses 22, 32, and on the guide surface 41 of the radial bearing 4, there is provided a dynamic pressure generation recess 42. There is provided a rotational body 5 on which the opposed surfaces 51, 52, 53 are rotatably formed with respect to the guide surfaces 21, 31, 41. In this case, the rotational body 5 is rotated around the center of the radial bearing 4. A polygonal mirror 7 is fixed to an outer periphery of the rotational body 5 together with the attachment members 6, 61. A magnet 6A is provided on the attachment member 6. On the rotational support device 1, there is provided a stator coil 8 opposed to the magnet 8. When the stator coil 8 is energized, the rotational body 5 is rotated by induction at high speed.

In this example, the rotational body 5 is used, the dimensions of which are described as follows. The external diameter is 22 mm, the internal diameter is 10 mm, and the thickness is 6 mm.

Figure 2:
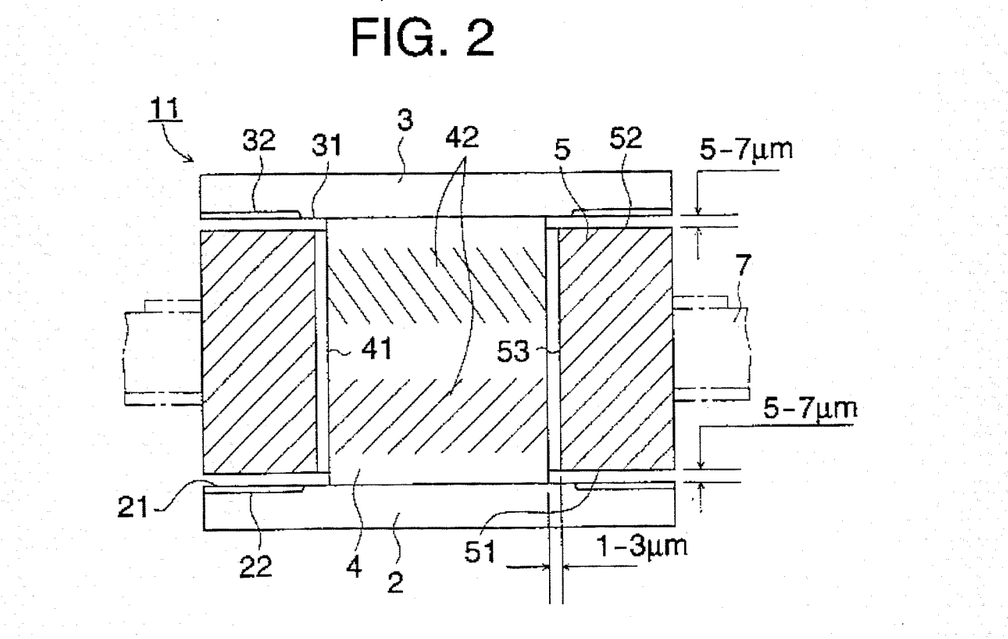
FIG. 2 is a sectional view showing an example of each clearance formed in the dynamic pressure bearing of the present invention.

FIG. 2 is a view for showing the clearances formed in the thrust bearings 2, 3 and the radial bearing 4 when the rotational body 5 is rotated. The dynamic pressure generation recesses 22, 32, 42 are provided in the following manner: Under the condition that the rotational body is stably rotated, clearances are determined to be 5 to 7 μm which are provided between the guide surfaces 21, 32 on which the dynamic pressure generation recesses 22, 32 of the thrust bearings 2, 3 are formed and the surfaces 51, 52 of the rotational body 5 opposed to the guide surfaces 21, 31. Under the condition that the rotational body is stably rotated, the clearance is determined to be 1 to 3 μm which is provided between the guide surface 41 of the radial bearing 4 and the opposed surface 53 of the rotational body 5.

When the clearances are set in the above manner, the rotational motion is carried out as follows. When the rotational body 5 and the polygonal mirror 7 are rotated at high speed, even if the rotational position of the rotational body 5 is changed at little due to an inclined arrangement of the device or vibration, the opposed surfaces 51, 52 of the rotational body 5 are not contacted with the guide surfaces 21, 31 of the thrust bearings 2, 3, and only the opposed surface 53 of the rotational body 5 slightly comes into contact with the guide surface 41 of the radial bearing 4. In order to prevent the abrasion and heat generation, the radial bearing 4 may be made of ceramics.

Figure 3:
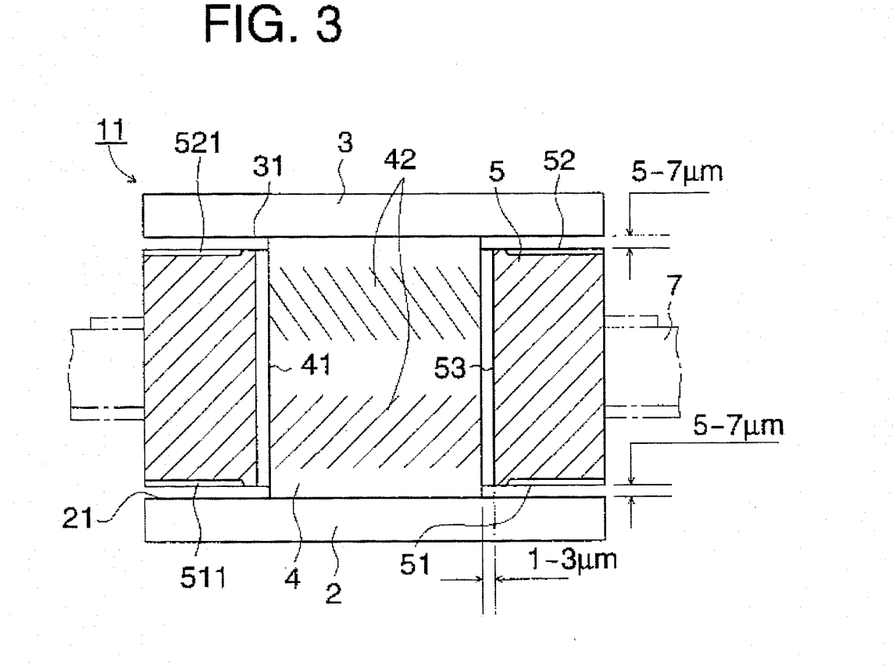
FIG. 3 is a sectional view showing another example of each clearance formed in the dynamic pressure bearing of the present invention.

In the same manner as that shown in FIG. 2, FIG. 3 is a view for showing the clearances formed in the thrust bearings 2, 3 and the radial bearing 4 when the rotational body 5 is rotated. The dynamic pressure generation recesses 22, 32, 42 are provided in the following manner:

Under the condition that the rotational body is stably rotated, clearances are determined to be 5 to 7 µm which are provided between the guide surfaces 21, 32 of the thrust bearings 2, 3 are formed and the opposed surfaces 51, 52 of the rotational body 5 opposed to the guide surfaces 21, 31. Under the condition that the rotational body is stably rotated, the clearance is determined to be 1 to 3 µm which is provided between the guide surface 41 of the radial bearing 4 and the opposed surface 53 of the rotational body 5.

In this example, instead of the dynamic pressure generation recesses 22, 32 provided on the guide surfaces 21, 31 of the thrust bearings 2, 3, dynamic pressure generation recesses 511, 521 are provided on the opposed surfaces 51, 52 of the rotational body 5. When the clearances are set in the above manner, the rotational motion is carried out as follows. When the rotational body 5 and the polygonal mirror 7 are rotated at high speed, even if the rotational position of the rotational body 5 is changed at little due to an inclined arrangement of the device or vibration, the opposed surfaces 51, 52 of the rotational body 5 are not contacted with the guide surfaces 21, 31 of the thrust bearings 2, 3, and only the opposed surface 53 of the rotational body 5 slightly comes into contact with the guide surface 41 of the radial bearing 4. In order to prevent the abrasion and heat generation, the radial bearing 4 may be made of ceramics.

Figure 4:
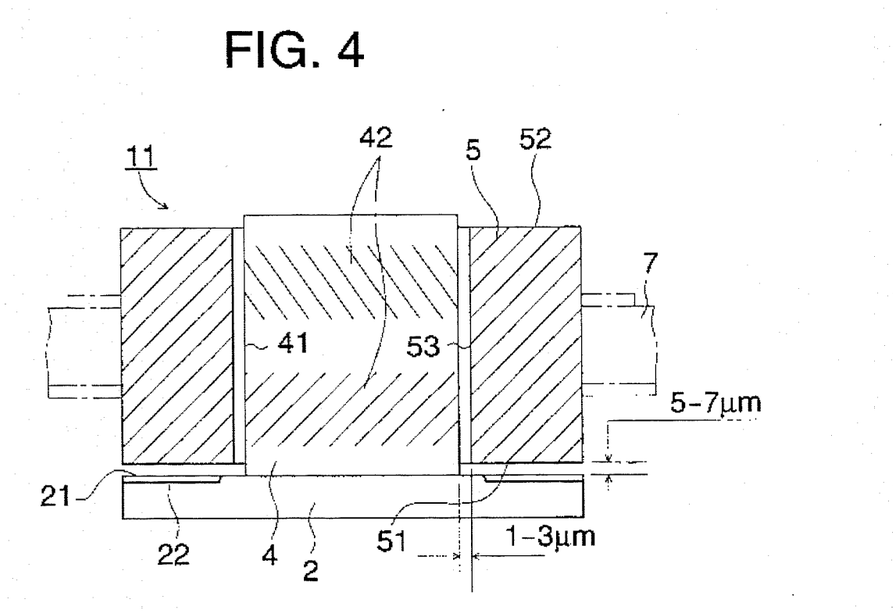
FIG. 4 is a sectional view showing another example of each clearance formed in the dynamic pressure bearing of the present invention.

FIG. 4 is a view showing another example of the dynamic pressure bearing illustrated in FIG. 2. In this example, only the thrust bearing 2 is provided. In this example, the dynamic pressure generation recesses 22, 42 are provided in the following manner:

Under the condition that the rotational body is stably rotated, the clearance between the guide surface 21 of the thrust bearing 2 and the opposed surface 51 of the rotational body 5 is set to be 5 to 7 µm, and under the condition that the rotational body is stably rotated, the clearance between the guide surface 41 of the radial bearing 4 and the opposed surface 53 of the rotational body 5 is set to be 1 to 3 µm. In this example, by the action of the dynamic pressure generation recess 22 provided on the guide surface 21 of the thrust bearing 2, and also by the action of the dynamic pressure generation groove 42 of the radial bearing 4, the rotational motion is carried out as follows. When the rotational body 5 and the polygonal mirror 7 are rotated at high speed, even if the rotational position of the rotational body 5 is changed at little due to an inclined arrangement of the device or vibration, the opposed surface 51 of the rotational body 5 is not contacted with the guide surface 21 of the thrust bearing 2 and only the opposed surface 53 of the rotational body 5 slightly comes into contact with the guide surface 41 of the radial bearing 4. In order to prevent the abrasion and heat generation, the radial bearing 4 may be made of ceramics.

Figure 5:
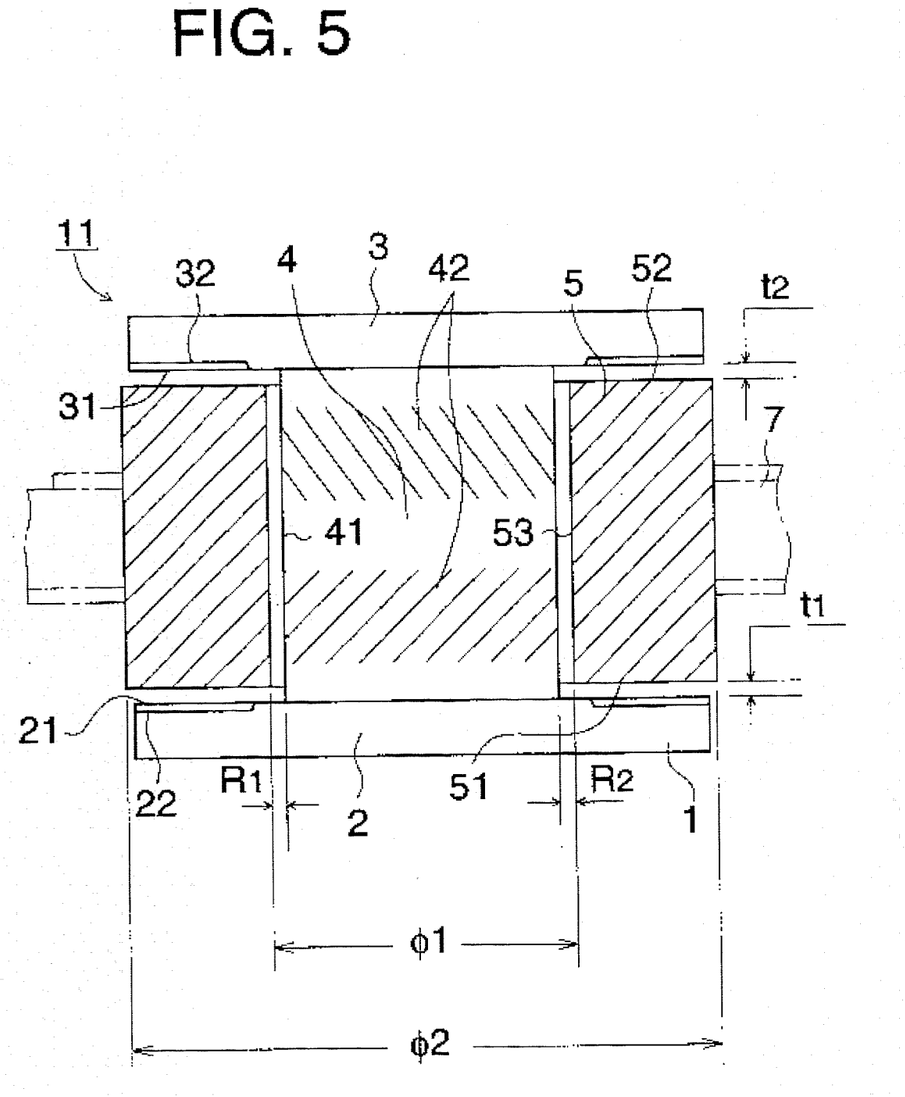
FIG. 5 is a sectional view showing the setting of each clearance formed in the dynamic pressure bearing of the present invention.

FIG. 5 is a view showing the clearances provided in the radial bearing 4 and the thrust bearings 2, 3 of the dynamic pressure bearing 11 shown in FIG. 2 in the case where the rotational body 5 is stably rotated. In this case, the clearances between the guide surface 41 of the radial bearing 4 and the opposed surface 53 of the rotational body 5 are respectively $R_1$ and $R_2$, and the clearances between the guide surfaces 21, 31 of the thrust bearings 2, 3 and the opposed surfaces 51, 52 are respectively $t_1$ and $t_2$. When $t_1 < t_2$ and $R_1 < R_2$ in the stable rotation of the rotational body 5, it is set so that the inequality $t_1 > R_1$ can be satisfied.

Due to the foregoing, it is possible to effectively prevent the periphery of the rotational body from coming into contact with the thrust bearing. When the following approximate expression is satisfied, it is possible to more effectively prevent the periphery of the rotational body from coming into contact with the thrust bearing.

$$t_1 > \phi_2/\phi_1 \times R1$$

where the internal diameter of the rotational body 5 is $\phi_1$ and the external diameter is $\phi_2$.

In FIGS. 1, 2, 3 and 5 showing the examples of the present invention, the dynamic pressure generation recesses 22, 32 are provided on the guide surfaces 21, 31 of the thrust bearing 2, 3. However, the dynamic pressure generation recesses 22, 32 may be provided only on the guide surface 21 or 31. Also, the dynamic pressure generation recesses 511, 521 of the rotational body 5 may be provided only on one of the opposed surfaces 51, 52 of the rotational body 5.

Figure 6:
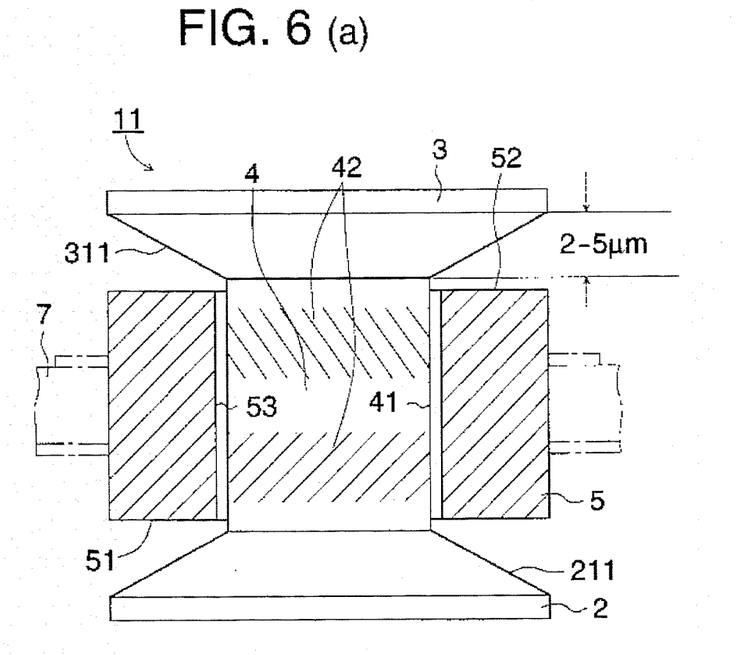
FIGS. 6(a) and 6(b) are sectional views showing another example of the dynamic pressure bearing of the present invention.

FIGS. 6(a) and 6(b) are views showing other examples. In the example illustrated in FIG. 6(a), the guide surfaces 21, 31 in the thrust bearings 2, 3 are formed into inclined surfaces 211, 311. The polygonal mirror 7 is attached to the rotational body 5. From the opposed surfaces 51, 52 of the rotational body 5, the inclined surfaces 211, 311 are successively separated outwardly as illustrated in the drawing. Therefore, the thrust bearings 2, 3 are separate from the opposed surfaces by 2 to 5 µm at the maximum. The reason why the upper limit is determined to be 5 µm is to generate a sufficiently high wind pressure. The reason why the lower limit is determined to be 2 µm is to conduct machining easily in the manufacturing process. In the same manner as that illustrated in FIG. 2, the clearance between the guide face 41 of the radial bearing 4 and the opposed face 53 of the rotational body 5 is set to be 1 to 3 µm, under the condition that the rotational body 5 is stably rotated. The outer peripheral positions of the opposed surfaces 51, 52 are separate from the inclined surfaces 211, 311 by a long distance. Next, in the device of this example illustrated in FIG. 6(b), the guide faces 21, 31 of the thrust bearings 2, 3 are formed into curved inclined surfaces 212, 312. In other words, the inclined surfaces 212, 312 are inclined being curved in such a manner that the inclined surfaces 212, 312 are gradually separated from the opposed surfaces 51, 52 outwardly, and the thrust bearings 2, 3 are separate by 2 to 5 µm at the maximum. In the same manner as that illustrated in FIG. 2, a clearance formed between the guide surface 41 of the radial bearing 4 and the opposed surface 53 of the rotational body 5 is 1 to 3 µm, under the condition that the rotational body 5 is stably rotated. Accordingly, in the same manner as that illustrated in FIG. 6(a), the outer peripheral positions on the opposed surfaces 51, 52 are separated by a long distance since the curved inclined surfaces 212, 312 are provided.

In the examples shown FIGS. 6(a) and 6(b) explained above, when the rotational body 5 provided with the polygonal mirror 7 is rotated at a speed higher than 3000 rpm, the opposed surface 53 of the rotational body 5 is rotated while it maintains a clearance of 1 to 3 µm by the action of the dynamic pressure generation recess 42. Even when the dynamic pressure bearing 11 is inclined or vibration is caused, or even when small foreign objects, the sizes of which are several µm, enter the clearance, the opposed surfaces 51, 52 of the rotational body 5 do not come into contact with the outer peripheral portions of the inclined surfaces 211, 311, 212, 312 attached to the thrust bearings 2, 3.

Figure 7:
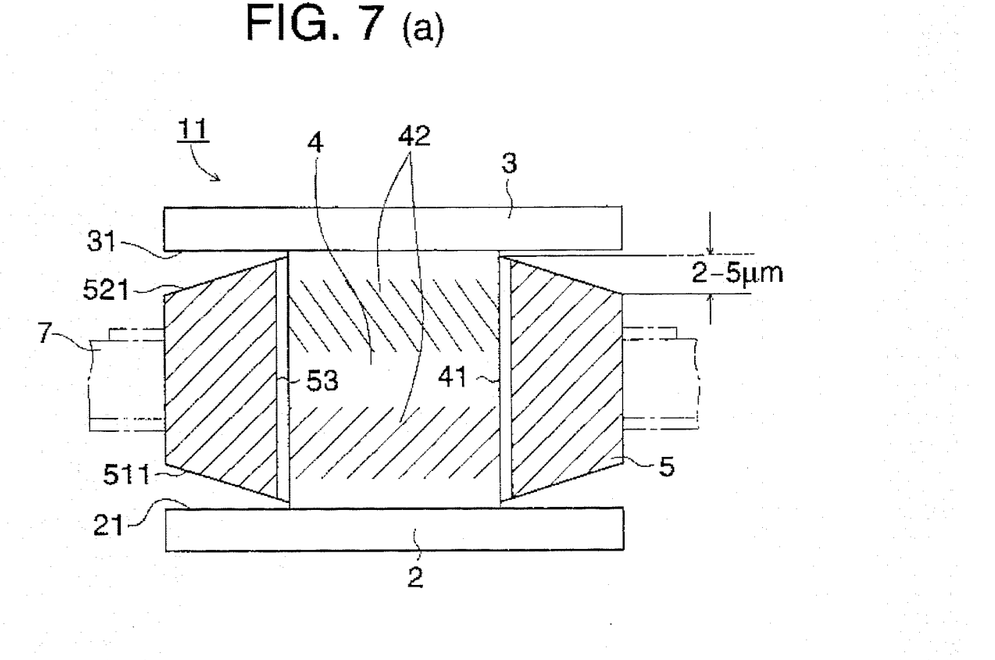
FIGS. 7(a) and 7(b) re sectional views showing another example of the dynamic pressure bearing of the present invention.

FIGS. 7(a) and 7(b) are other examples of the apparatus illustrated in FIG. 3. In the apparatus shown in FIG. 7(a), the opposed surfaces 51, 52 of the rotational body 5 provided with the polygonal mirror 7 are formed into inclined surfaces 511, 521. The inclined surfaces 511, 521 are inclined in such a manner that the inclined surfaces 511, 521 are gradually separated from the guide surfaces 21, 31 of the thrust bearings 2, 3 to the outside, and the maximum distance between the rotational body 5 and the guide surfaces 21, 31 of the thrust bearings 2, 3 is 2 to 5 μm. In the same manner as that shown in FIG. 2, the distance between the guide surface 41 of the radial bearing 4 and the opposed surface 53 of the rotational body 5 is 1 to 3 μm, under the condition that the rotational body 5 is stably rotated. Accordingly, the outer periphery of the rotational body 5 is greatly separated from the guide surfaces 21, 31 of the thrust bearings 2, 3 by the inclinations of the inclined surfaces 511, 521.

In the apparatus shown in FIG. 7(b), the opposed surfaces 51, 52 of the rotational body 5 provided with the polygonal mirror 7 are formed into inclined curved surfaces 511, 521. The inclined curved surfaces 511, 521 are inclined in such a manner that the inclined curved surfaces 511, 521 are gradually separated from the guide surfaces 21, 31 of the thrust bearings 2, 3 to the outside, and the maximum distance between the rotational body 5 and the guide surfaces 21, 31 of the thrust bearings 2, 3 is 2 to 5 μm. In the same manner as that shown in FIG. 2, the distance between the guide surface 41 of the radial bearing 4 and the opposed surface 53 of the rotational body 5 is 1 to 3 μm, under the condition that the rotational body 5 is stably rotated. Accordingly, the outer periphery of the rotational body 5 is greatly separated from the guide surfaces 21, 31 of the thrust bearings 2, 3 by the inclinations of the inclined curved surfaces 511, 521.

In the above examples illustrated in FIGS. 7(a) and 7(b), when the rotational body 5 provided with the polygonal mirror 7 is rotated at a speed higher than 3000 rpm, a clearance of 1 to 3 μm is formed between the guide surface 41 of the radial bearing 4 and the opposed surface 53 of the rotational body 5 by the action of the dynamic pressure generating recess 42, Even when the dynamic pressure bearing 11 is inclined or vibration is caused at this time, the inclined surfaces 511, 521, 512, 522 formed on the opposed surfaces 51, 52 of the rotational body 5 are not contacted with the outer peripheral portions of the guide surfaces 21, 31 of the thrust bearings 2, 3.

Figure 8:
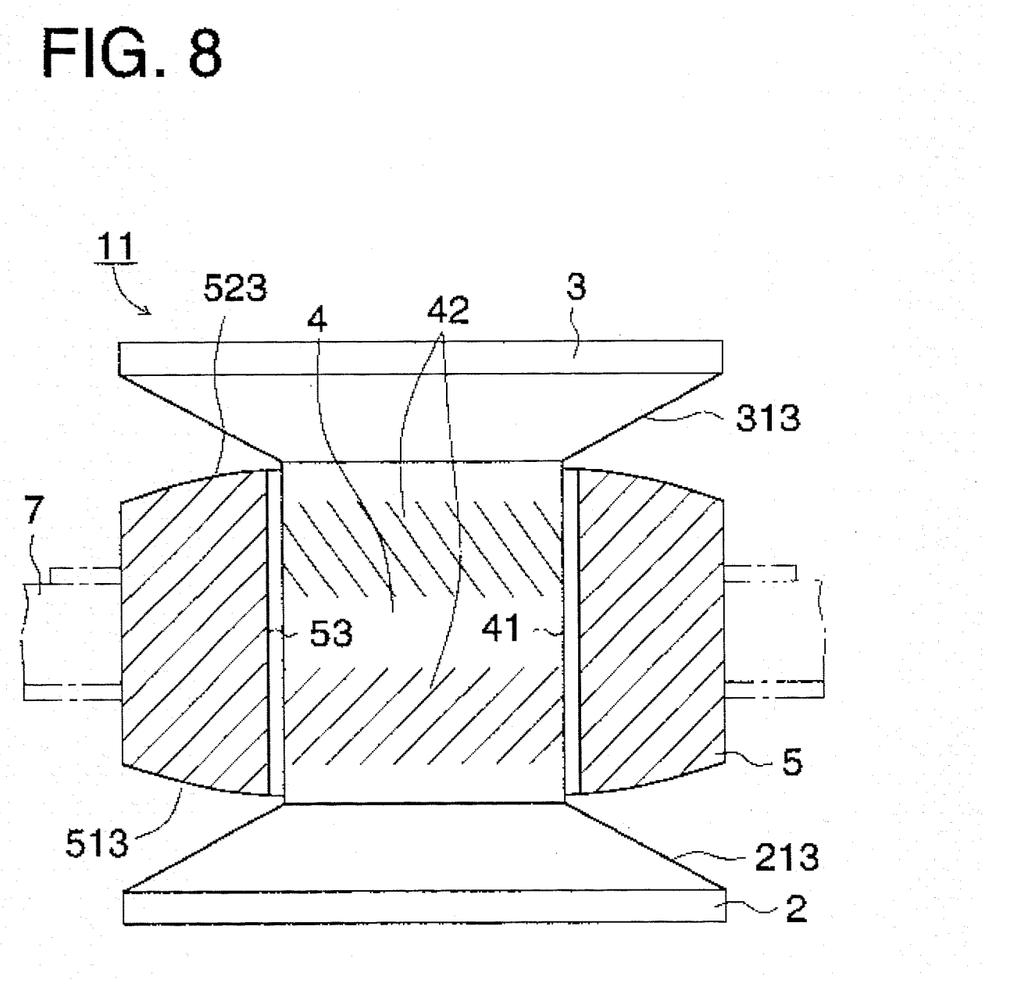
FIG. 8 s a sectional view showing another example of the dynamic pressure bearing of the present invention.

FIG. 8 is a view showing another example of the apparatus shown in FIGS. 2, 3, 4, 6(a), 6(b), 7(a) and 7(b). In this example, the guide surfaces 21, 31 of the thrust bearings 2, 3 are formed to be inclined surfaces 213, 313. The inclined surfaces 213, 313 are provided in such a manner that the inclined surfaces 213, 313 are gradually separated from the opposed surfaces 51, 52 of the rotational body 5 provided with the polygonal mirror 7. In the same manner as that illustrated in FIG. 2, the distance between the guide surface 41 of the radial bearing 4 and the opposed surface 53 of the rotational body 5 is maintained to be 1 to 3 μm, under the condition that the rotational body 5 is stably rotated. The opposed surfaces 51, 52 of the rotational body 5 provided with the polygonal mirror 7 are formed into inclined curved surfaces 513, 523. That is, the inclined curved surfaces 513, 523 are inclined in such a manner that they are gradually separated from the inclined surfaces 213, 313 of the thrust bearings 2, 3. Due to the inclinations of the inclined surfaces 213, 313 of the thrust bearings 2, 3 and also due to the inclinations of the inclined curved surfaces 513, 523 of the rotational body 5, the outer periphery of the rotational body 5 and the outer peripheries of the inclined surfaces 213, 313 are separated from each other by a long distance. The maximum distance is determined to be 4 to 10 μm. Accordingly, the peripheries of the rotational bodies are separated from each other by a long distance.

In the example illustrated in FIG. 8, when the rotational body 5 provided with the polygonal mirror 7 is rotated at a speed higher than 3000 rpm, the opposed surface 53 of the rotational body 5 maintains a clearance of 1 to 3 μm by the action of the dynamic pressure generating recess 42 provided in the radial bearing 4. Even when the dynamic pressure bearing 11 is inclined or vibration is caused at this time, the inclined curved surfaces 513, 523 formed on the rotational body 5 are not contacted with the outer peripheral portions of the inclined surfaces 213, 313 of the thrust bearings 2, 3.

As described above, the dynamic pressure bearing of the present invention is composed in the following manner. Compared with the clearance formed between the thrust bearing and the rotational body, the clearance formed between the opposed surfaces of the rotational body opposed to the radial bearing provided on the axis is small. The outer periphery of the rotational body, the rotational speed of which is increased, is prevented from coming into contact with the thrust bearing. Therefore, it is possible to prevent the rotational body having the polygonal mirror from being damaged when it comes into contact with the thrust bearing, that is, the occurrence of galling or seizing can be prevented. Accordingly, it is possible to install the rotational body provided with the polygonal mirror in an inclined condition, if necessary, and even when vibration is given from the outside, the rotational body can be stably rotated at a rotational speed not less than 3000 rpm over a long period of time.

When the polygonal mirror, the rotational speed of which is increased, is used for an image forming apparatus or printer, the image quality can be enhanced and the image can be outputted at high speed. Even in the case of contact, portions of low peripheral speed come into contact with each other. Therefore, the occurrence of galling can be reduced, and selections can be made from various materials, so that the cost can be reduced.

What is claimed is:

1. A dynamic pressure generating bearing comprising:
   (a) a rotational body having a rotational axis;
   (b) a radial bearing provided adjacent to a center of the rotational body for rotatably supporting the rotational body around the radial bearing; and
   (c) at least one thrust bearing provided on at least one end of the radial bearing,
   wherein when the rotational body is rotated while maintaining a rotational stability thereof, a minimum clearance generated between the rotational body and the at least one thrust bearing is always larger than a minimum clearance generated between the rotational body and the radial bearing regardless of an orientation of the rotational axis of the rotational body.

2. The dynamic pressure generating bearing of claim 1, wherein a dynamic pressure generating recess is formed on at least one of the radial bearing and the at least one thrust bearing.

3. The dynamic pressure generating bearing of claim 1, wherein when the radial bearing has a circumferential speed smaller than that of the at least one thrust bearing, the rotational body contacts the radial bearing.

4. The dynamic pressure generating bearing of claim 1, wherein the radial bearing is made of a ceramic material.

5. The dynamic pressure generating bearing of claim 1, wherein a dynamic pressure generating recess is formed on the radial bearing and in the rotational body.

6. The dynamic pressure generating bearing of claim 1, wherein the radial bearing has two ends, and a thrust bearing is provided on both ends of the radial bearing.

7. The dynamic pressure generating bearing of claim 1, wherein a clearance between the at least one thrust bearing and the rotational body is formed so that the clearance increases as a distance from a rotational center of the rotational body toward a circumferential direction thereof increases.

8. The dynamic pressure generating bearing of claim 7, wherein the increasing clearance is generated by an inclined surface formed on at least one of a surface of the at least one thrust bearing and a surface of the rotational body, both surfaces facing each other.

9. The dynamic pressure generating bearing of claim 8, wherein the increasing clearance generated by the inclined surface is varied between 2 to 5 μm.

10. The dynamic pressure generating bearing of claim 1, wherein the following condition is satisfied:

$$t1 > \phi2/\phi1 \times R1$$

where t1 represents said minimum clearance generated between the rotational body and the thrust bearing, R1 represents said minimum clearance generated between the rotational body and the radial bearing, $\phi1$ represents an inner diameter of the rotational body and $\phi2$ represents an outer diameter of the rotational body.

11. The dynamic pressure generating bearing of claim 1, further comprising:

a magnet provided on an attachment member fixed to an outer periphery of the rotational body; and a stator coil provided on a rotational support device for supporting the thrust bearing, the stator coil being opposed to the magnet to attract the magnet when the stator coil is energized.

12. The dynamic pressure generating bearing of claim 1, wherein the minimum clearance generated between the rotational body and the at least one thrust bearing satisfies the following expression:

$$t1 > \phi2/\phi1 \times R1$$

where t1 represents said minimum clearance generated between the rotational body and the at least one thrust bearing, $\phi1$ and $\phi2$ are the internal and external diameters, respectively, of the rotational body, and R1 represents the minimum clearance generated between the rotational body and the radial bearing.

* * * * *